US012685978B2

(12) United States Patent
Kim

(10) Patent No.: US 12,685,978 B2
(45) Date of Patent: Jul. 21, 2026

(54) FOLDABLE AGITATOR

(71) Applicants: Autobiography Co., Ltd., Incheon (KR); ENVIRONMENTAL CORPORATION OF INCHEON, Incheon (KR)

(72) Inventor: Su Hyoun Kim, Seoul (KR)

(73) Assignees: Autobiography Co., Ltd., Incheon (KR); ENVIRONMENTAL CORPORATION OF INCHEON, Incheon (KR)

( * ) Notice: Subject to any disclaimer, the term of this patent is extended or adjusted under 35 U.S.C. 154(b) by 756 days.

(21) Appl. No.: 18/015,528

(22) PCT Filed: Jan. 21, 2021

(86) PCT No.: PCT/KR2021/000839

§ 371 (c)(1),
(2) Date: Jan. 10, 2023

(87) PCT Pub. No.: WO2022/014808

PCT Pub. Date: Jan. 20, 2022

(65) Prior Publication Data

US 2023/0256400 A1 Aug. 17, 2023

(30) Foreign Application Priority Data

Jul. 15, 2020 (KR) ........................ 10-2020-0087277

(51) Int. Cl.
*B01F 27/054* (2022.01)
*B01F 27/072* (2022.01)
(Continued)

(52) U.S. Cl.
CPC ........ *B01F 27/0541* (2022.01); *B01F 27/072* (2022.01); *B01F 27/113* (2022.01); *B01F 27/91* (2022.01); *B01F 2101/305* (2022.01)

(58) Field of Classification Search
CPC ............... B01F 27/054; B01F 27/0541; B01F 27/0542; B01F 27/0543
See application file for complete search history.

(56) References Cited

U.S. PATENT DOCUMENTS 5,197,803 A * 3/1993 Wall .................... B01F 27/0541 366/184
7,685,896 B2 * 3/2010 Haughton ............. B01F 35/325 74/44
(Continued)

FOREIGN PATENT DOCUMENTS

CN 109012323 A * 12/2018 .............. B01F 27/90
GB 142853 A 12/1920
(Continued)

OTHER PUBLICATIONS

International Search Report in International Application No. PCT/KR2021/000839, dated Apr. 27, 2021, 3 pages.

*Primary Examiner* — Claire X Wang
*Assistant Examiner* — Patrick M Mccarty
(74) *Attorney, Agent, or Firm* — Bridgeway IP Law Group, PLLC; Jihun Kim

(57) ABSTRACT

Disclosed is a foldable agitator. The foldable agitator according to one aspect of the present invention comprises: a coupling body; impeller arms rotatably coupled to the coupling body; and a piston, inserted in the coupling body so as to be movable vertically, for rotating the impeller arms in the process of moving to induce same to fold and unfold.

9 Claims, 15 Drawing Sheets

(51) Int. Cl.

| | |
|---|---|
| ***B01F 27/113*** | (2022.01) |
| ***B01F 27/91*** | (2022.01) |
| *B01F 101/00* | (2022.01) |

(56) References Cited

U.S. PATENT DOCUMENTS

| | | | | | |
|---|---|---|---|---|---|
| 8,899,825 | B2 * | 12/2014 | Denize | .................... | B01F 27/88<br>366/605 |
| 9,616,991 | B2 * | 4/2017 | Wirasnik | .............. | B64C 11/002 |
| 9,878,295 | B2 * | 1/2018 | Marshall | ................ | C12M 27/02 |
| 2005/0088907 | A1 * | 4/2005 | Vanek | ................... | B01F 27/113<br>366/342 |
| 2016/0193575 | A1 * | 7/2016 | Dinnison | ............ | B01F 27/0541<br>366/343 |
| 2016/0213199 | A1 * | 7/2016 | Hensel | ................ | A47J 43/0772 |

FOREIGN PATENT DOCUMENTS

| | | | | |
|---|---|---|---|---|
| JP | H08-187422 | A | | 7/1996 |
| JP | H10235176 | A | * | 9/1998 |
| JP | 2016-203161 | A | | 12/2016 |
| KR | 10-2015-0055191 | A | | 5/2015 |
| KR | 10-1550254 | B1 | | 9/2015 |
| KR | 10-2185180 | B1 | | 12/2020 |

* cited by examiner

FOLDABLE AGITATOR

CROSS-REFERENCE TO RELATED APPLICATIONS

This application is a National Phase Application of PCT International Application No. PCT/KR2021/000839, which was filed on Jan. 21, 2021, and which claims priority from Korean Patent Application No. 10-2020-0087277 filed on Jul. 15, 2020. The disclosures of the above patent applications are incorporated herein by reference in their entirety.

BACKGROUND

Technical Field

The present invention relates to a foldable agitator capable of folding and unfolding the impellers.

Description of the Related Art

Tanks such as aerobic tanks and anaerobic tanks used in wastewater treatment facilities are installed with a vertical agitator, which may be used for various purposes such as preventing sedimentation of waste within the tank, suppressing the production of floc, and inducing a uniform mixing of chemicals. The vertical agitator is gaining reputation for not only maintenance safety but also its energy efficiency and agitation efficiency. As such, many sites have upgraded to or planning upgrades to vertical agitators. The structure of a typical vertical agitator 10 illustrated in FIG. 1 includes impellers 14 fixedly coupled to the perimeter of a hub 12 by fastening members such as bolts 16.

In the case of a conventional vertical agitator, the submersible portion is moved into the lower part of the tank with the large impellers separated, and the impellers are subsequently secured (assembled) with bolts. Thus, the conventional vertical agitator could only be applied either in facilities where the top of the tank has an opening large enough to install an agitator with the impellers already secured (assembled) or in facilities where the rate of treatment allows for the emptying of the tank during the installation of the agitator.

During maintenance (inspection), a technician inspecting the conventional vertical agitator must personally enter the tank, after the wastewater is removed, in order to examine the state of the impellers, as the impellers have a direct impact on the efficiency of the agitator.

As this involves the technician entering the lower part of the tank, which is filled with toxic gases, this can be a difficult and dangerous task. Moreover, in a facility that cannot afford to delay treatment, it would not be feasible to empty the treatment tank, and as such, it was practically impossible to perform a thorough inspection of the impellers.

SUMMARY OF THE INVENTION

Technical Problem

An aspect of the present invention, which was conceived to resolve the problems above, is to provide a foldable agitator that is capable of folding and unfolding the impellers.

Other objectives of the present invention will be more clearly understood from the embodiments set forth below.

Technical Solution

A foldable agitator according to one aspect of the invention may be coupled with an outer shaft and an inner shaft that is movable vertically within the outer shaft and may include: a coupling body; an impeller arm rotatably coupled to a perimeter of the coupling body; and a piston inserted in the coupling body such as to be movable vertically, where the piston may unfold the impeller arm when the inner shaft undergoes a movement process.

A foldable agitator according to an embodiment of the present invention can include one or more of the following features. For example, a multiple number of impeller arms can be coupled to the perimeter of the coupling body, and the piston can rotate the multiple impeller arms simultaneously.

The coupling body can include body coupler parts, to which the impeller arms may be coupled, and piston insertion parts, which may be provided in the center of the body coupler parts and within which the piston may be movably inserted; an insertion slot can be formed between a pair of adjacent body coupler parts; the piston can include a pressing protrusion positioned to be movable within the insertion slot; and the impeller arm can be rotated as the pressing protrusion moves up or down.

The body coupler parts can be provided in an integrated form and can correspond to a single member.

The piston insertion part can include movement slots in a number corresponding to the impeller arms, and the piston can include a multiple number of insertion modules, which may be movably inserted in the movement slots, and heads, which may be coupled to both ends of the insertion modules, where the pressing protrusion can be formed on one side of an insertion module.

The body coupler part can include an insertion member, which may form the piston insertion part, and a coupling member, which may be formed on one side of the insertion member and to which the impeller arm may be coupled, where a pair of adjacent coupling members can be separated by a gap corresponding to the insertion slot.

An upper support member and a lower support member can be provided on a side surface of the coupling body, and both ends of the upper support member and the lower support member can support the coupling members.

The upper support member can include a first body support surface and a second body support surface, and the impeller arm can include a first arm support surface contacting the first body support surface and a second arm support surface contacting the second body support surface, where the first body support surface and the first arm support surface can contact each other in a central direction, and the second body support surface and the second arm support surface can contact each other in a rotational direction.

The impeller arm can include an arm pressing part, which may be inserted in the insertion slot and rotatably coupled to the coupling member, and an arm coupling part, which may be formed bent in a particular angle at one end of the arm pressing part to determine an unfolding angle of the impeller and may be coupled with an impeller.

The foldable agitator can further include a shaft, which may be coupled to the body coupler part, and an inner stem, which may be positioned to form a dual shaft structure and may press the piston.

The foldable agitator can be provided on one or more levels.

An impeller can be coupled to the impeller arm, where the impeller can be formed with a greater width at its center portion thereof with the portion connecting with the coupling body.

Advantageous Effects

An embodiment of the invention having the features above can provide various advantageous effects including the following. However, an embodiment of the invention may not necessarily display all of the effects below.

An embodiment of the invention can provide a foldable agitator that is capable of folding and unfolding the impellers.

DETAILED DESCRIPTION OF THE INVENTION

Figure 1:
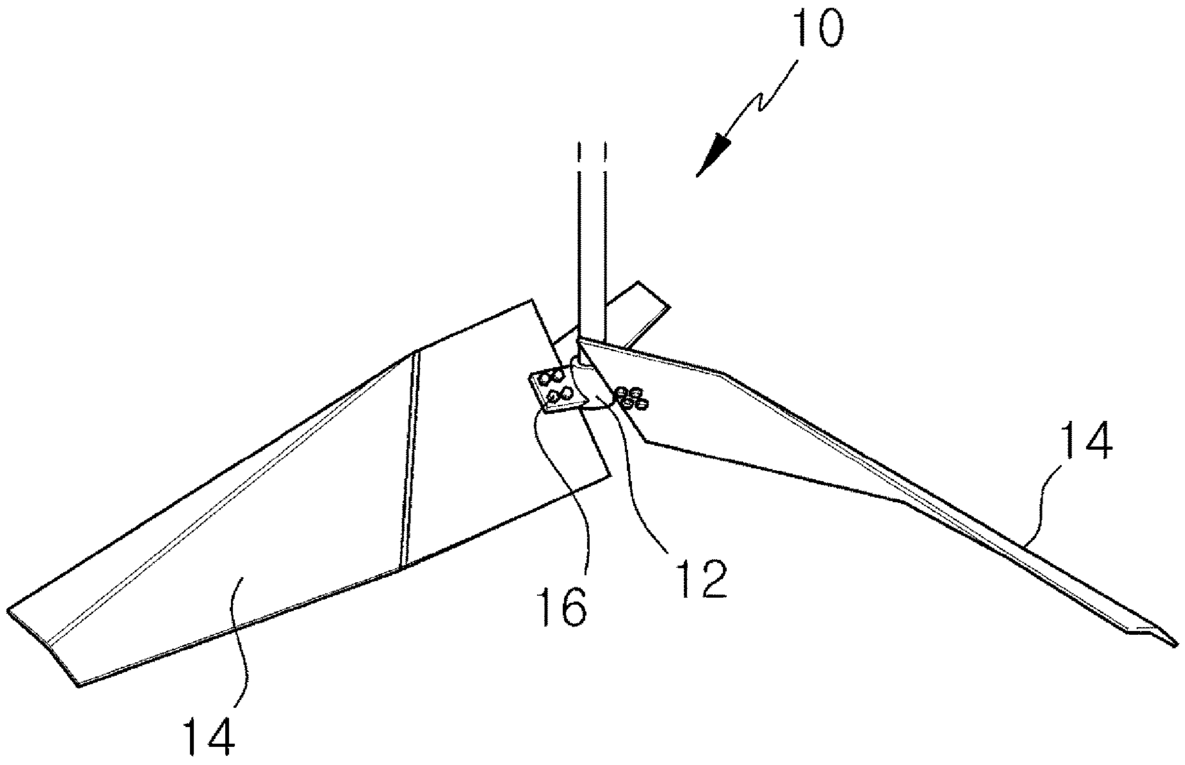
FIG. 1 illustrates a conventional agitator.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

The terms used in the present specification are merely used to describe particular embodiments and are not intended to limit the present invention. An expression used in the singular encompasses the expression of the plural, unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

While such terms as "first" and "second," etc., can be used to describe various components, such components are not to be limited by the above terms. The above terms are used only to distinguish one component from another.

Certain embodiments of the present invention will be described below in more detail with reference to the accompanying drawings. Those components that are the same or are in correspondence are rendered the same reference numeral, and redundant descriptions are omitted.

Figure 2:
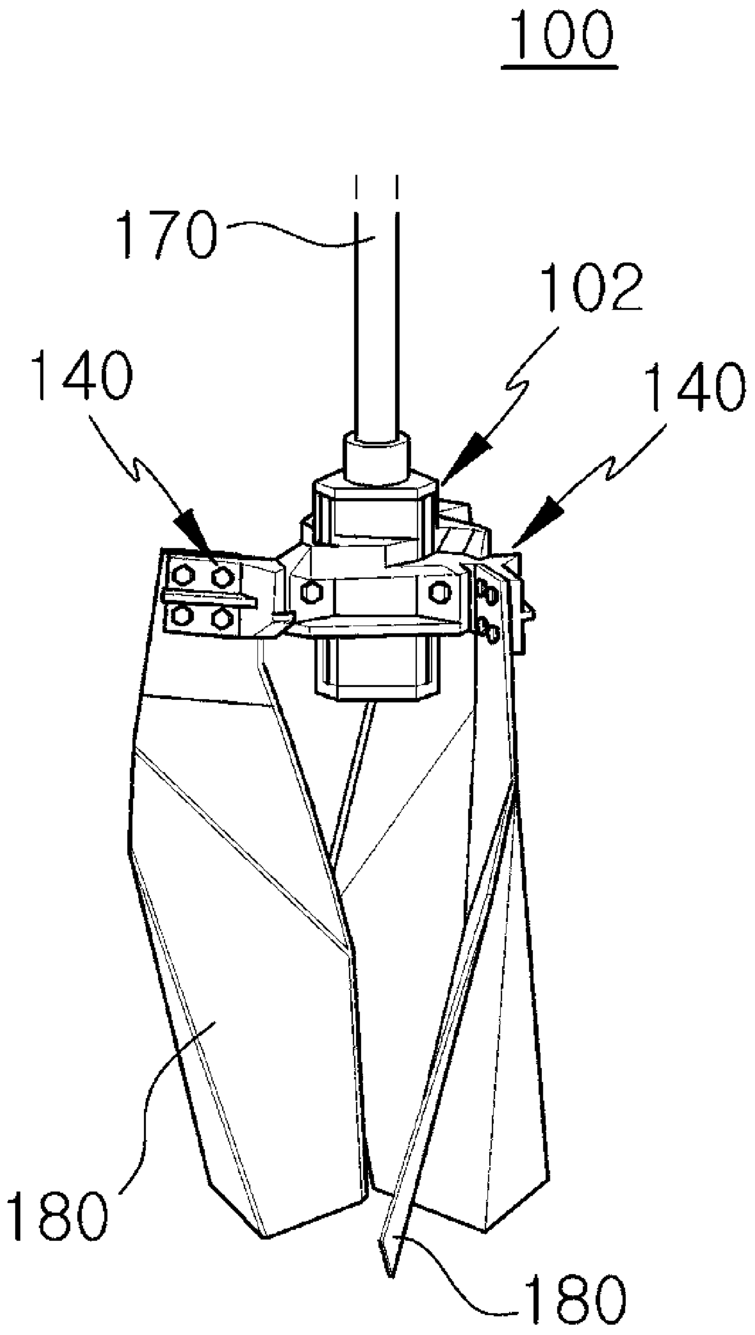
FIG. 2 and FIG. 3 illustrate an agitator according to an embodiment of the invention.
Figure 3:
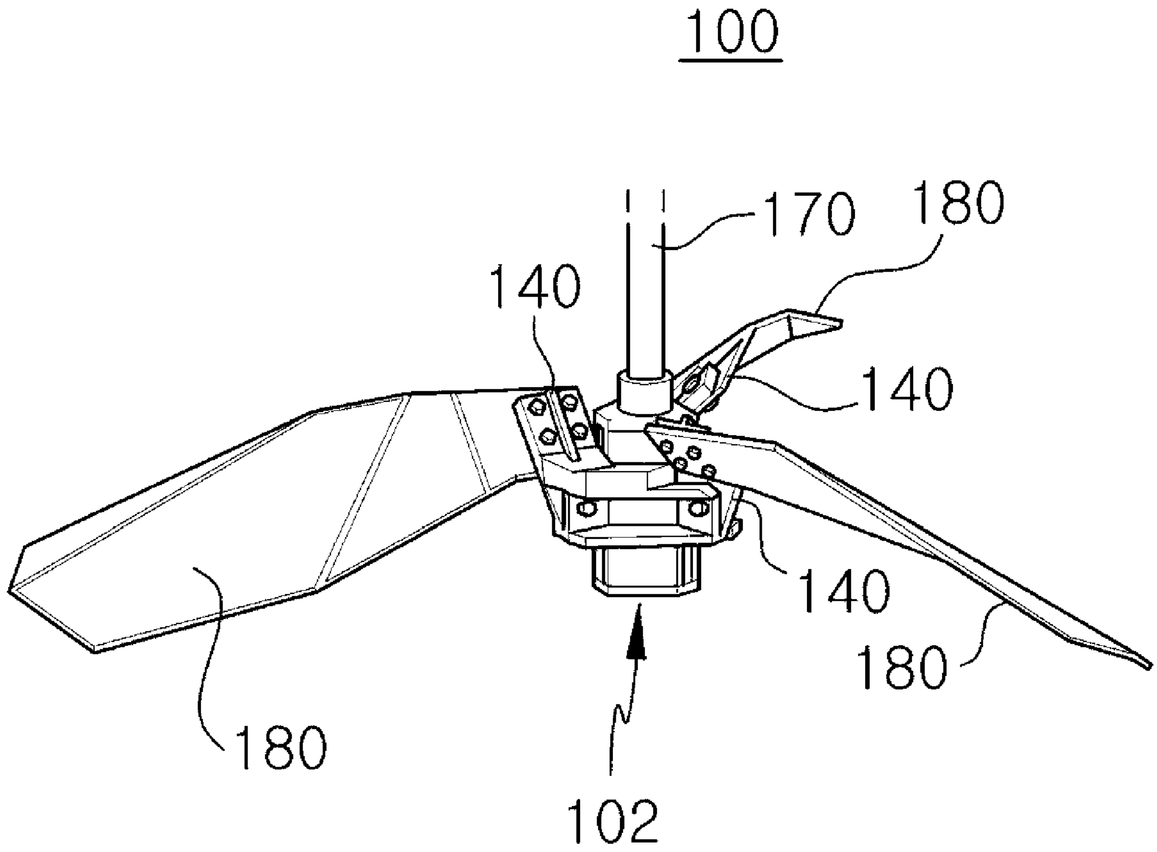

FIG. 2 and FIG. 3 illustrate a foldable agitator 100 according to an embodiment of the invention, where FIG. 2 illustrates the state in which the three impellers 180 are all folded, and FIG. 3 illustrates the state in which the impellers 180 have all rotated from the state in FIG. 2 to an unfolded state.

Referring to FIG. 2 and FIG. 3, a foldable agitator 100 according to this embodiment may have multiple impellers 180 rotatably coupled to the perimeter of the coupling body 102, where all of the impellers 180 may rotate simultaneously to be folded as in FIG. 2 or unfolded as in FIG. 3. Since an agitator 100 according to this embodiment is thus provided with multiple impellers 180 in a foldable structure, the agitator 100 can be inserted into a tank with the impellers 180 coupled (as in FIG. 2), eliminating the need to remove all of the wastewater from inside the tank.

A foldable agitator 100 according to this embodiment may include a coupling body 102 that is coupled with the shaft 170 (see FIG. 14), impeller arms 140 that are coupled to be rotatable with respect to the coupling body 102, a piston 160 that is coupled to be vertically movable at the inside of the coupling body 102 and is configured to rotate the impeller arms 140, and impellers 180 that are coupled to the ends of the impeller arms 140.

Although a foldable agitator 100 according to this embodiment is illustrated as having three impellers 180 coupled, the invention is not to be limited with regard to the number of impellers 180. For example, a foldable agitator according to another embodiment of the invention can include two impellers 180 or four or more impellers 180.

Figure 4:
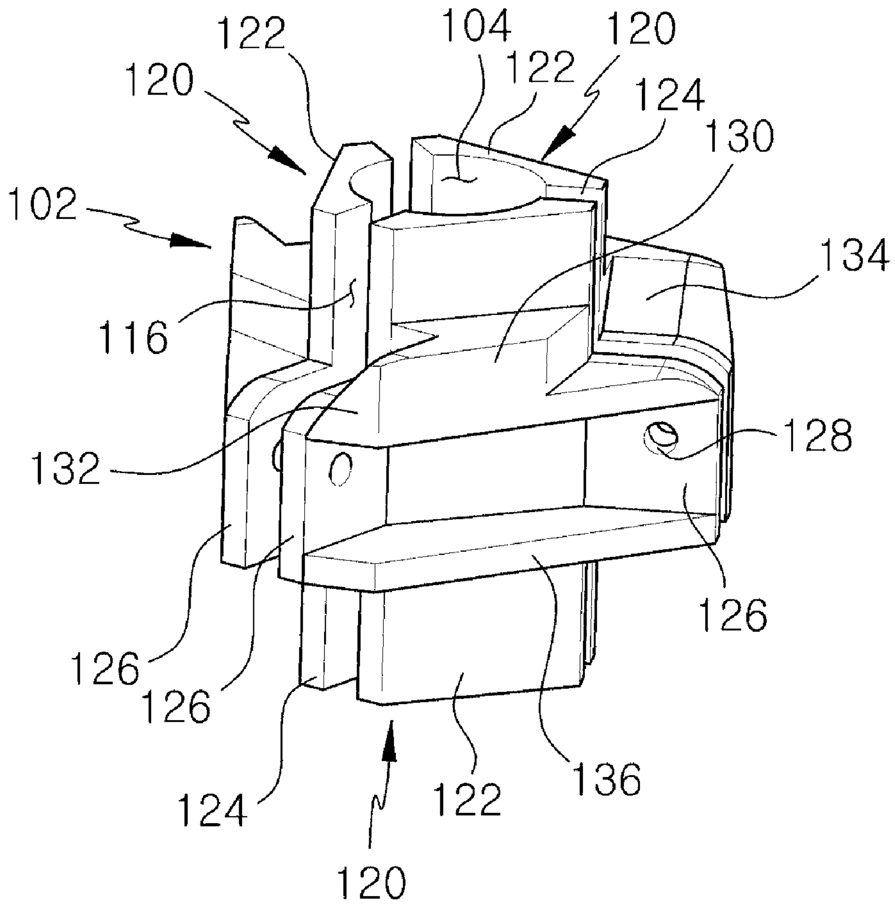
FIG. 4, FIG. 5, and FIG. 6 illustrate the coupling body of an agitator according to an embodiment of the invention.
Figure 5:
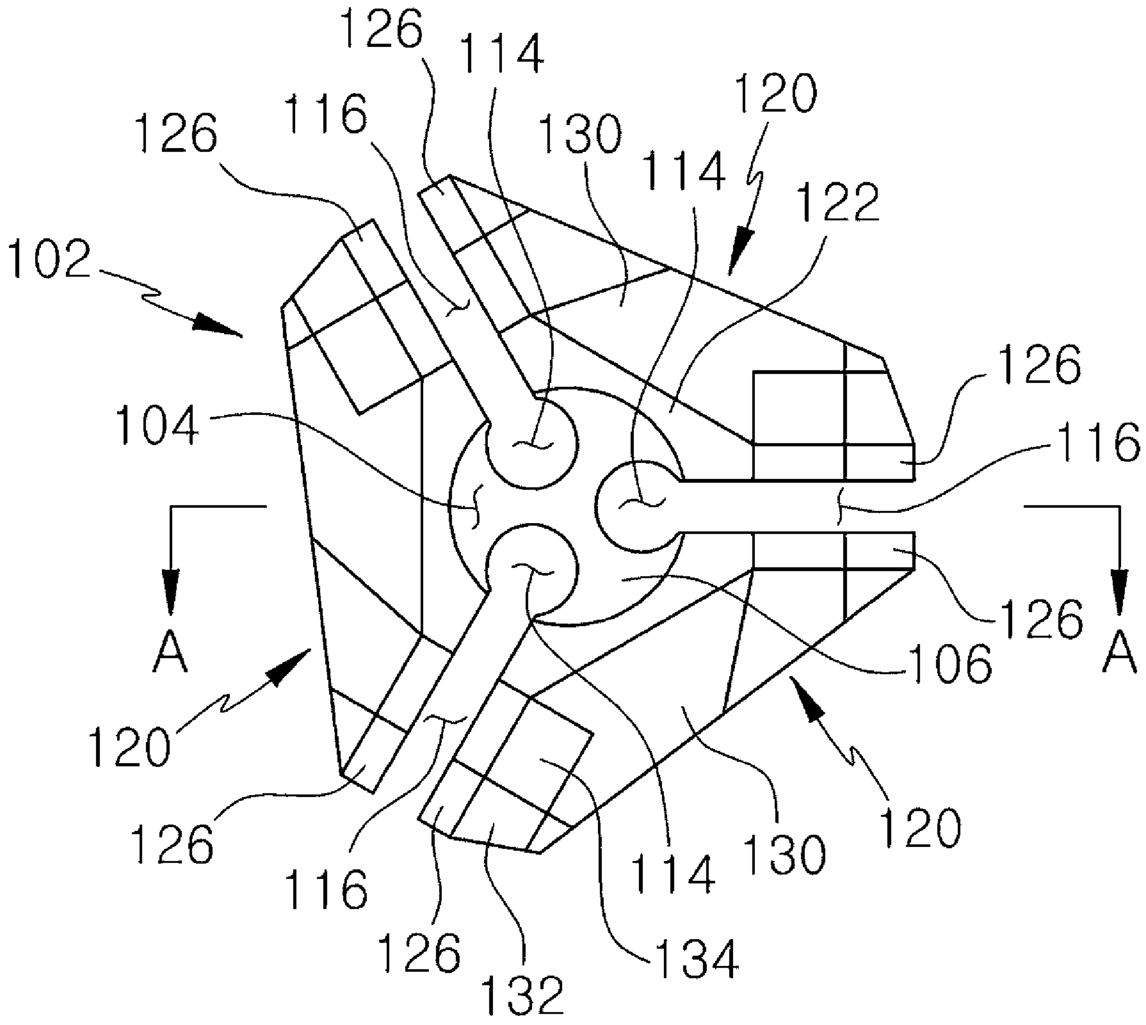
Figure 6:
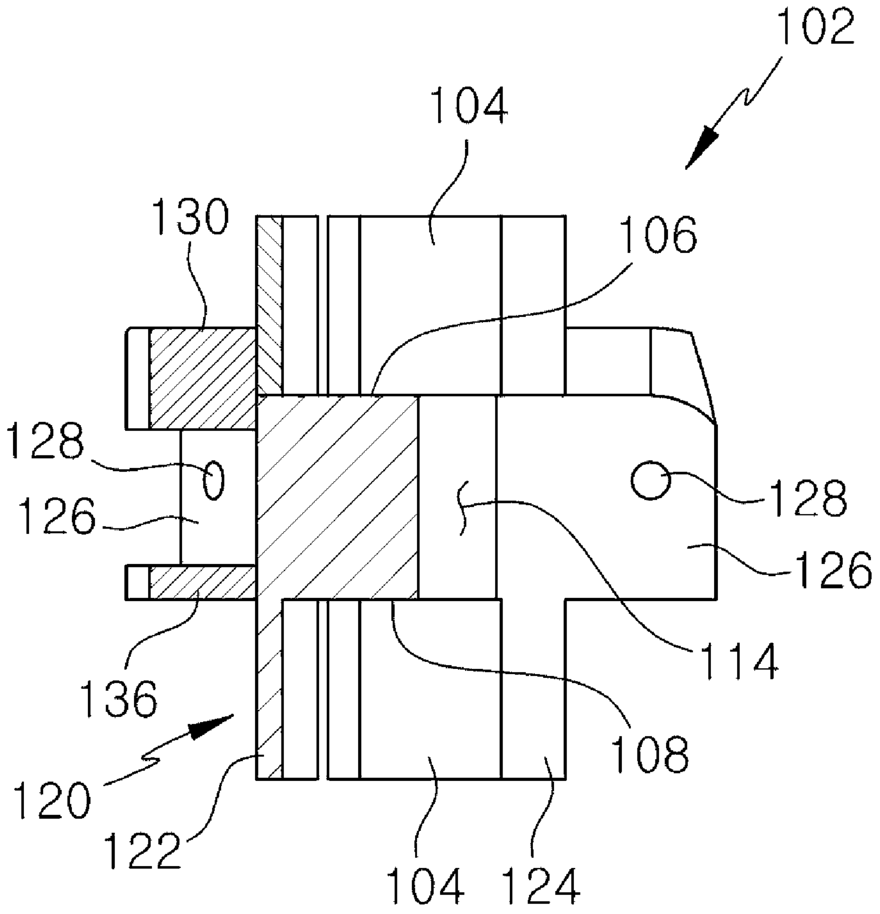

FIG. 4, FIG. 5, and FIG. 6 provide a perspective view, a plan view, and a cross-sectional view across line AA in FIG. 5, respectively, of the coupling body 102 in an agitator 100 according to an embodiment of the invention.

Referring to FIGS. 4 to 6, the coupling body 102 may include piston insertion parts 104, which may be provided in the center, and body coupler parts 120, which may be provided around the piston insertion parts 104 in a particular interval. The piston 160 may be inserted into the piston insertion parts 104 such as to be movable vertically. An impeller arm 140 may be rotatably coupled to each pair of adjacent body coupler parts 120, and all of the impeller arms 140 can be rotated by a single piston 160 to be unfolded or folded.

The coupling body 102 can be made from a material such as metal, etc., in an integrated form as a single member.

The piston insertion parts 104, corresponding to the centers of the three body coupler parts 120, may be shaped as hollow cylinders and may be formed symmetrically at an upper portion and a lower portion of the coupling body 102. The two piston insertion parts 104 may be open at the upper or lower end and may include an upper surface 106 and a lower surface 108. Both the upper surface 106 and the lower surface 108 may be shaped as a circular surface with three smaller circles (corresponding to movement slots 114) partially cut away.

The inner diameter of the piston insertion parts 104 may be the same or almost the same as the outer diameter of the heads 162 formed respectively on both ends of the piston 160. The heads 162 can move vertically at the inside of the piston insertion parts 104.

Three movement slots 114 may be formed in the center of the piston insertion part 104. The movement slots 114 may have a smaller diameter compared to the piston insertion part 104, and the insertion modules 164 (FIG. 7) of the piston 160 may be movably inserted in the movement slots 114. As illustrated in FIG. 6, the height of the movement slots 114 can be formed the same as the height of the piston insertion parts 104. The movement slots 114 can be structured to be open at the side surfaces, to thereby allow the pressing protrusions 166 (FIG. 7) formed on the side surfaces of the insertion modules 164 to protrude out of the piston insertion parts 104.

In-between the three body coupler parts 120, insertion slots 116 may be formed, corresponding to a particular gap. The arm pressing parts 142 of the impeller arms 140 may be rotatably inserted in the insertion slots 116. The open sides of the movement slots 114 may connect with the insertion slots 116.

Although the piston insertion parts 104 of the coupling body 102 according to this embodiment are illustrated as having a circular cross section and being formed symmetrically at an upper and a lower position, the invention is not to be limited with regard to the shape and arrangement structure of the piston insertion parts 104. For example, a coupling body according to another embodiment of the invention can include a piston insertion part formed with an elliptical or a polygonal cross section.

The body coupler parts 120 may be arranged around the piston insertion parts 104 in a constant interval, and in this embodiment, there are three body coupler parts 120 provided, each having the same size and shape.

A body coupler part 120 may include an insertion member 122, a coupling member 126, an upper support member 130, and a lower support member 136.

The insertion member 122 may have a rectangular shape on the outer surface but a curved shape on the inner surface so as to form the circularly shaped piston insertion parts 104. On the outer surface of the insertion member 122, an upper support member 130 and a lower support member 136 may be provided, while coupling members 126 may protrude outwardly from their left and right sides.

The inner surfaces of the three insertion members 122 may be interconnected, as illustrated in FIG. 5, to form a single integrated coupling body 102.

The length of the insertion members 122 can be formed to completely surround the piston 160 at its top dead center and bottom dead center, so that the piston 160 does not protrude out to the exterior.

The insertion members 122 may each include two side surfaces 124. Two side surfaces 124 that are adjacent may be arranged parallel to each other with a particular gap in-between. The gap formed between a side surface 124 and another side surface 124 may correspond to an insertion slot 116. A coupling member 126 may protrude outward from the center of the side surface 124.

The coupling member 126 may be a plate structure having a quadrilateral shape and may have a fastening hole 128 formed in the center. A particular gap may be formed between a coupling member 126 and another coupling member 126, and the arm pressing part 142 of an impeller arms 140 may be rotatably inserted in this gap. A bolt (not shown), etc., may be coupled to the fastening hole 128 in a manner that allows the arm pressing part 142 to rotate.

The impeller arms 140 may be coupled to the coupling members 126, and the impellers 180 may be coupled to the impeller arms 140. Since the impellers 180 are subject to much pressure from the fluid during rotation, large loads may be concentrated on the impeller arms 140 and coupling members 126, which correspond to the coupling portions of the impellers 180. As such, upper support members 130 and lower support members 136 can be provided to support the impeller arms 140 and coupling members 126.

An upper support member 130 may protrude outward from the outer surface of an insertion member 122 and may have both ends connected respectively to the two coupling members 126 formed on the insertion member 122. Thus, the upper support member 130 may serve to support the coupling members 126. The upper support member 130 may include a first body support surface 132 and a second body support surface 134, which may contact a first arm support surface 152 and a second arm support surface 154 of an impeller arm 140 and thus provide support against loads in a central direction (represented by an arrow in FIG. 14) and in a rotational direction (represented by an arrow in FIG. 15), respectively.

Below the upper support member 130, there may be provided a lower support member 136. The lower support member 136 may also be formed protruding from the outer surface of the insertion member 122 and may have both ends connected respectively to the coupling members 126 to support the coupling members 126.

The upper support members 130 and lower support members 136 coupled to the three insertion members 122 can be arranged in a triangular shape (see FIG. 5).

Figure 7:
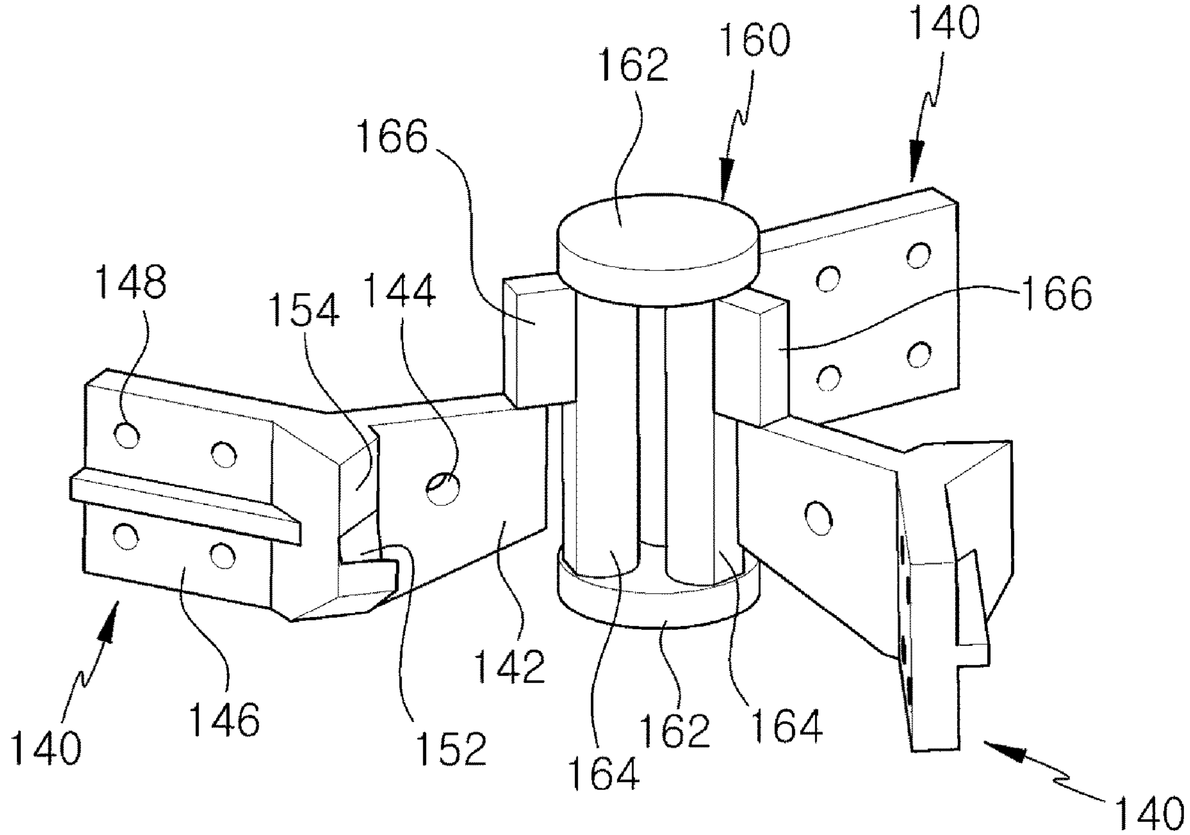
FIG. 7 and FIG. 8 illustrate the piston and the impeller arms in the state shown in FIG. 2.
Figure 8:
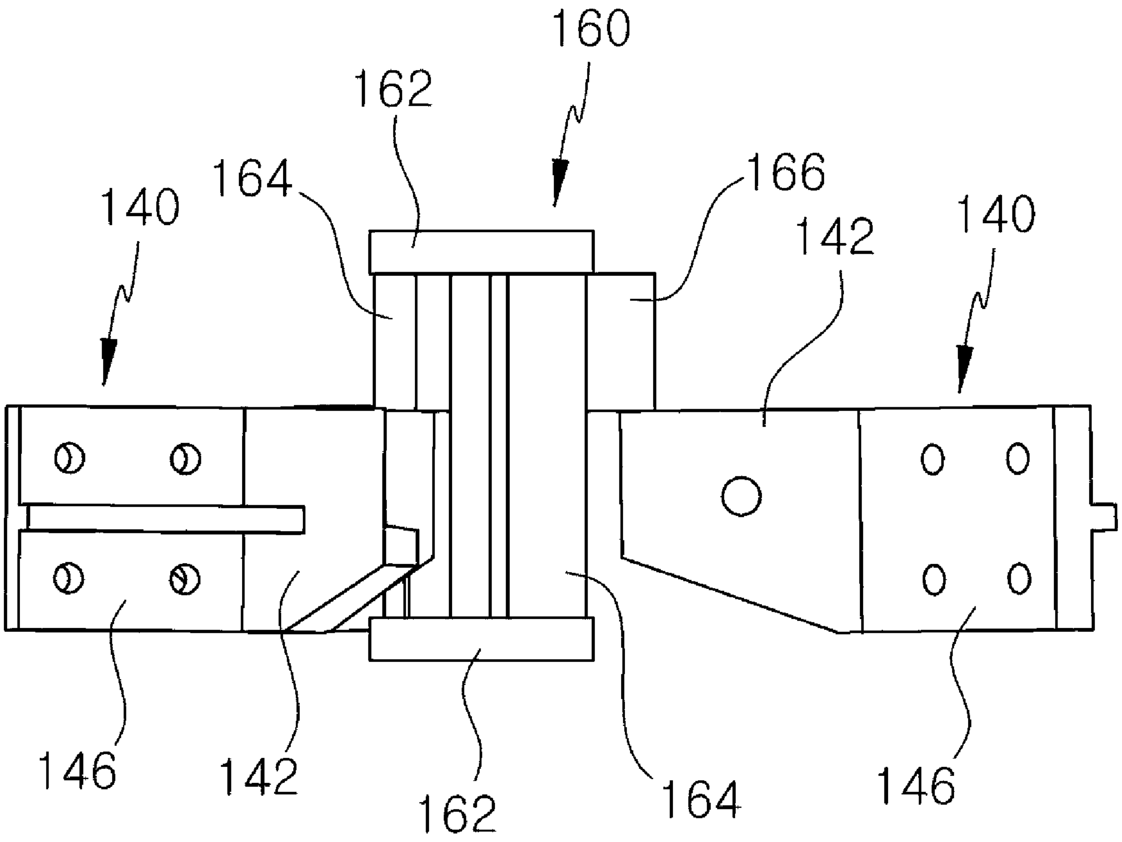
Figure 9:
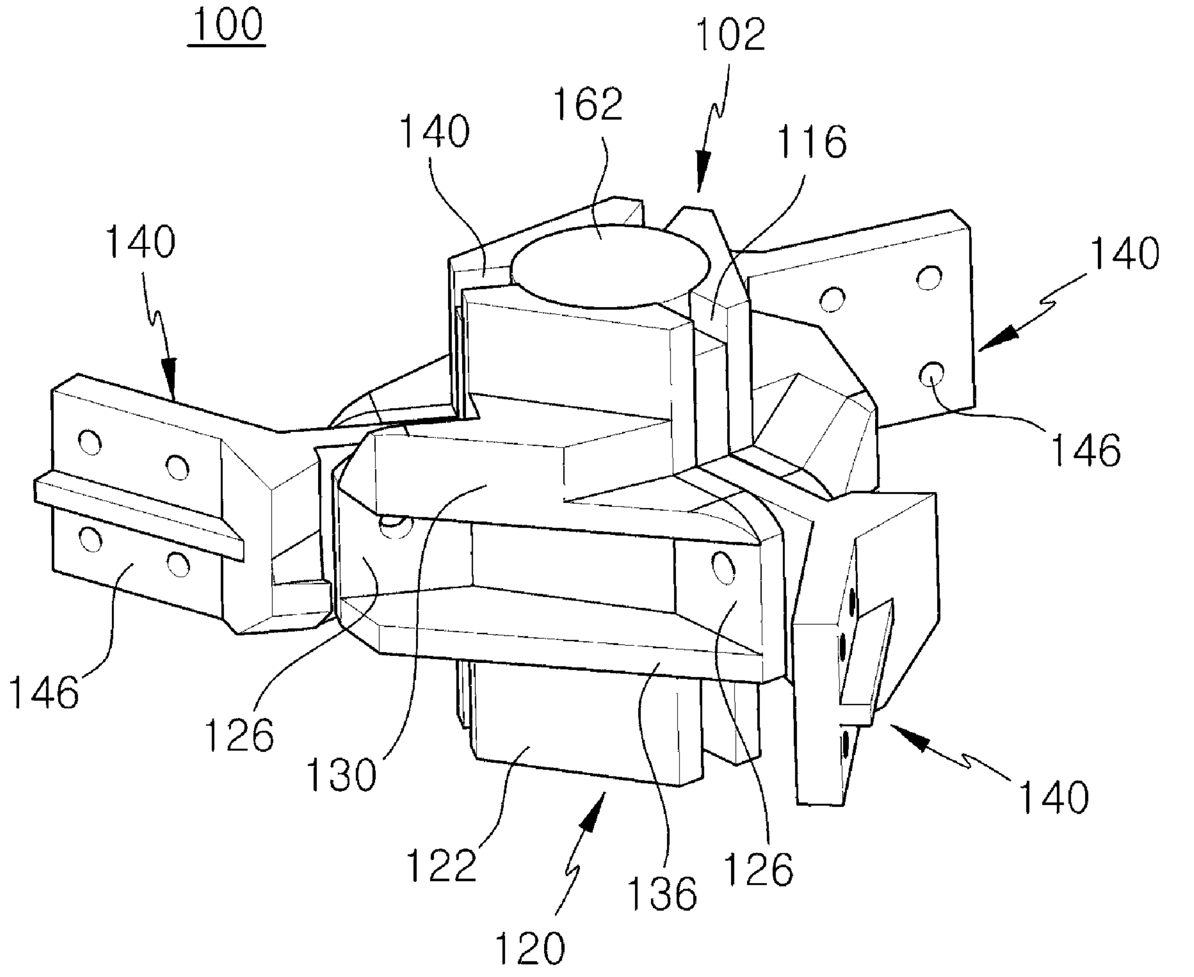
FIG. 9, FIG. 10, and FIG. 11 illustrate the impeller arms and the coupling body in the state shown in FIG. 2.
Figure 10:
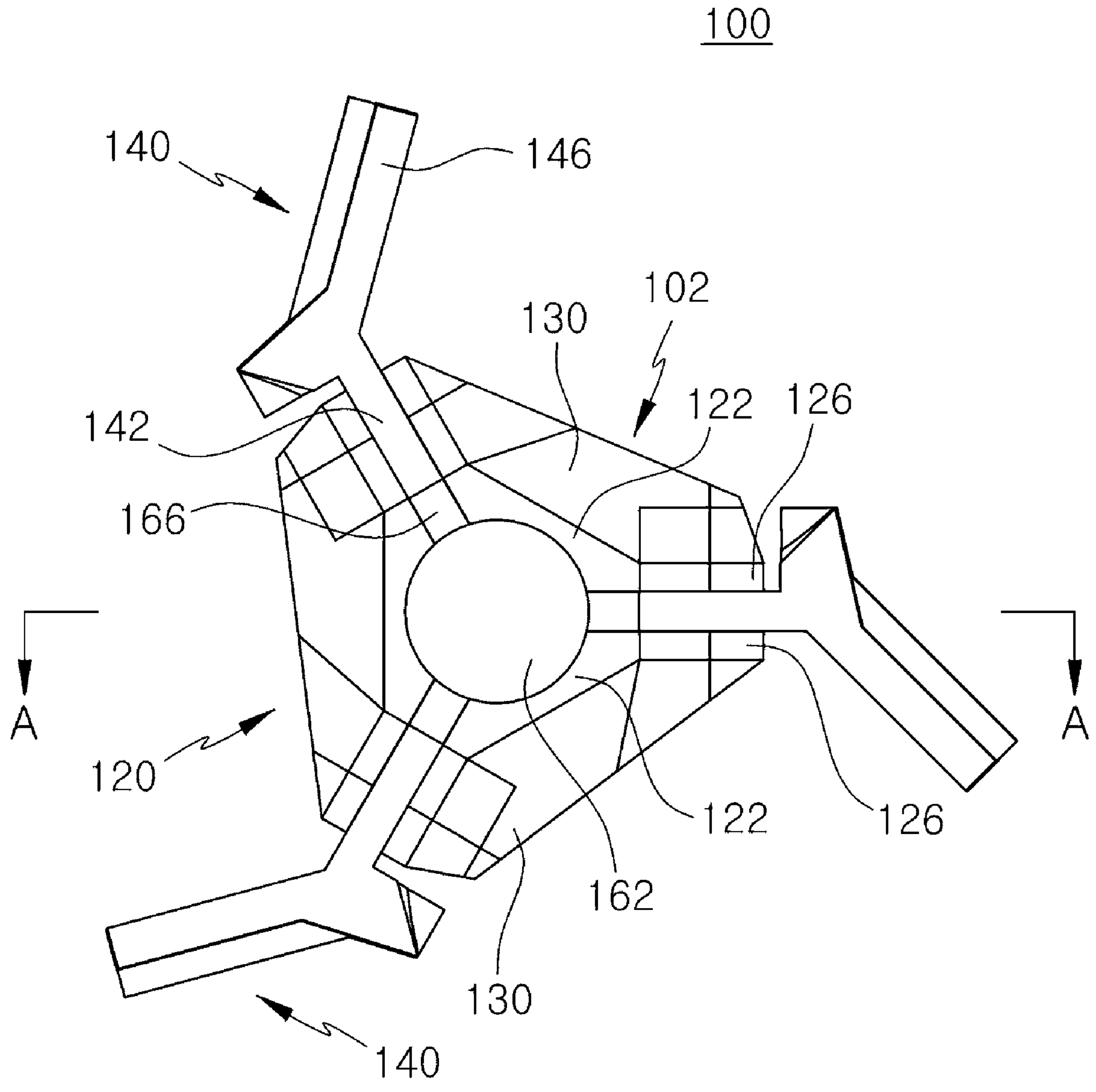
Figure 11:
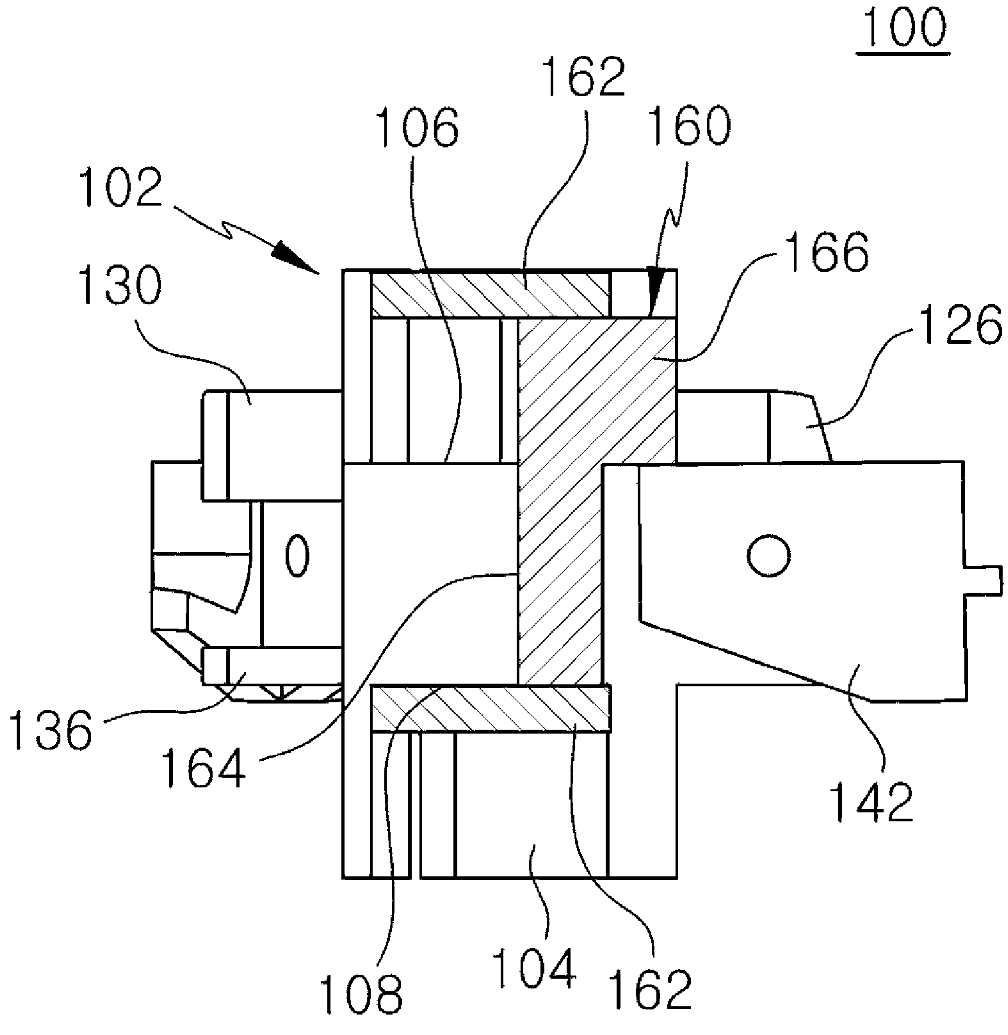

FIG. 7 and FIG. 8 illustrate the piston 160 and the impeller arms 140 in the state shown in FIG. 2, while FIG. 9 to FIG. 11 illustrate the impeller arms 140 and the coupling body 102 in the state shown in FIG. 2.

Incidentally, FIG. 7 and FIG. 11 illustrate the impellers 180 in a folded state. FIG. 11 shows a cross-sectional view across line AA in FIG. 10.

Referring to FIGS. 7 to 11, the piston 160 can include three insertion modules 164 and two heads 162.

An insertion module 164 can be implemented as a bar having a cross section corresponding to the movement slot 114 (shaped as a partially cut circle). The heads 162 can be formed as an integrated body on both ends of the insertion modules 164, while a pressing protrusion 166 can be provided on the side surface of each insertion module 164.

Three insertion modules 164 may be provided, in a number corresponding to the number of impellers 180, and the insertion modules 164 may be movably inserted in the movement slots 114. When the insertion modules 164 are inserted in the movement slots 114, the pressing protrusions 166 provided on the side surfaces may be inserted in the insertion slots 116.

The heads 162 may be coupled respectively to both ends of the insertion modules 164 so as to couple the three insertion modules 164 to one another. The head 162 located at the top can be coupled with the shaft (not shown). The piston 160, composed of the heads 162 and the insertion modules 164, can be moved up or down as a single member by the inner stem of the shaft, during the process of which the pressing protrusions 166 can rotate the impeller arms 140.

The inner stem 172 of the shaft can be rotatably coupled to the head 162 located at the top. The inner stem 172 can move up and down while rotating. During the upward and downward movement of the inner stem, however, the piston 160, including the head 162, can be moved up and down without rotating. The inner stem 172 can also be coupled to the head 162 located at the bottom, so that a foldable agitator according to an embodiment of the invention can be formed in a multi-level structure having two or more levels.

An impeller arm 140 may connect an impeller 180 with the coupling body 102 and may include an arm pressing part 142 and an arm coupling part 146.

The arm pressing part 142 may have a plate-like structure and may have a fastening hole 144 formed in the center. The arm pressing part 142 can be rotatably inserted between two insertion members 122 and can be hinge-coupled by way of a fastening member (not shown). A pressing protrusion 166 of the piston 160 can move up or down within the insertion slot 116 where the arm pressing part 142 is positioned, where the upward or downward movement of the pressing protrusion 166 can rotate the impeller arms 140 and cause the impeller 180 to unfold or fold.

The arm coupling part 146 may be shaped as a quadrilateral plate and may be connected to the end of the arm pressing part 142 while bent at a particular angle. A multiple number of fastening holes 148 may be formed in the arm coupling part 146, and fastening members (not shown) may be inserted in the fastening holes 148 for coupling with the impeller 180.

At the connecting portion between the arm pressing part 142 and the arm coupling part 146, there may be provided a first arm support surface 152 and a second arm support surface 154, which may contact the first body support surface 132 and the second body support surface 134 of the coupling body 102, respectively, to support the loads applied on the impeller arm 140.

Figure 12:
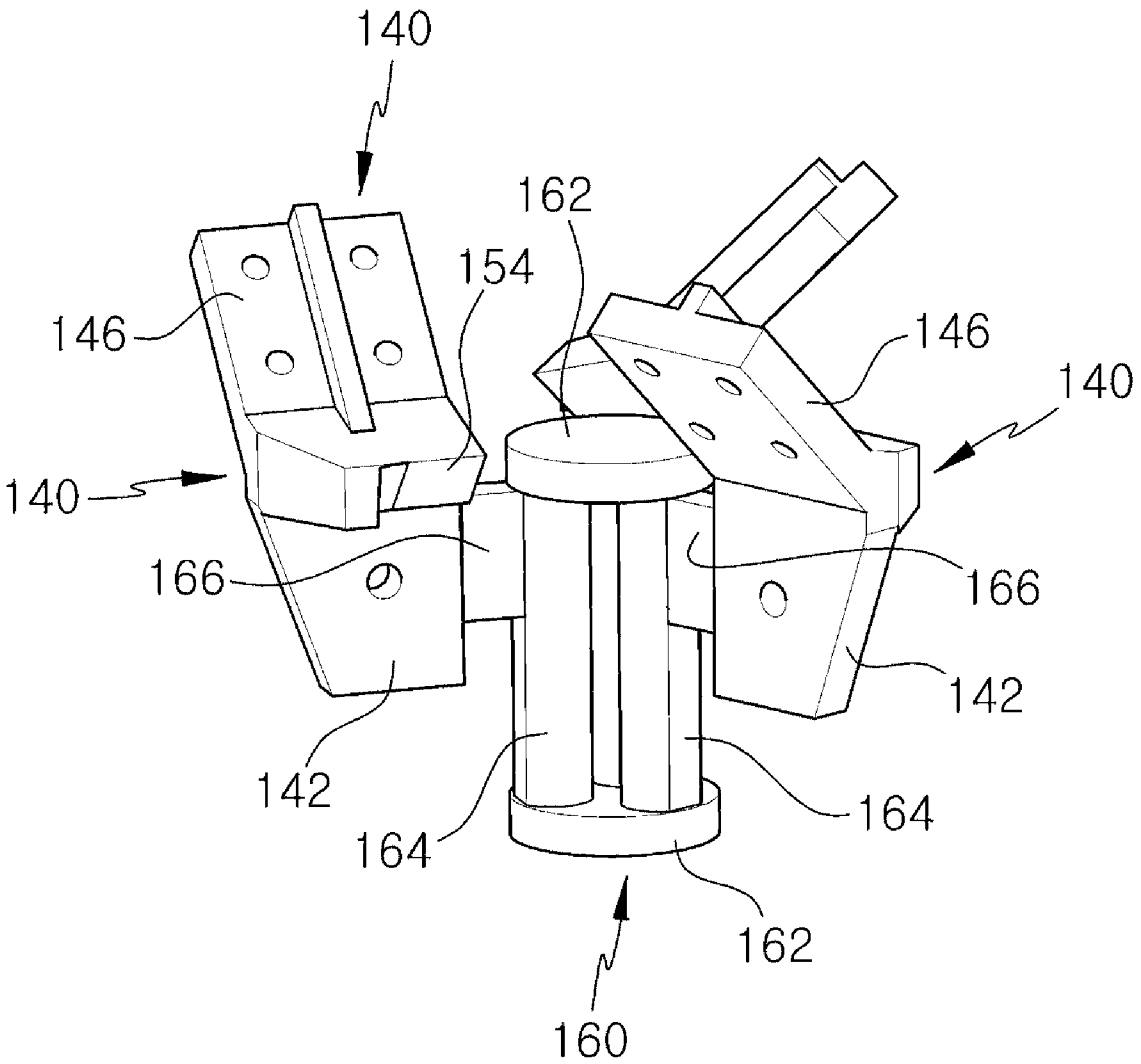
FIG. 12 and FIG. 13 illustrate the piston and the impeller arms in the state shown in FIG. 3.
Figure 13:
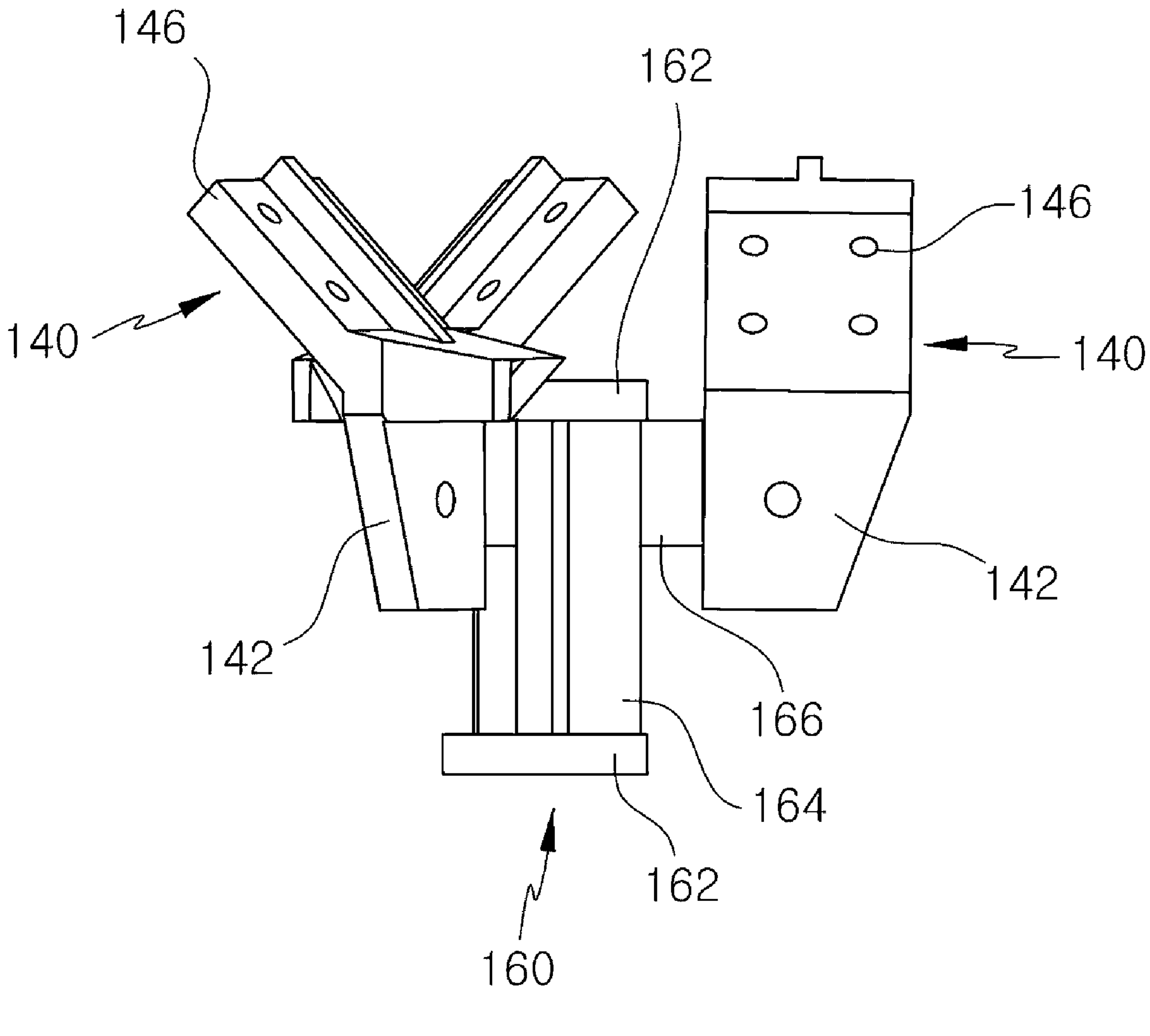

FIG. 12 and FIG. 13 illustrate the piston 160 and the impeller arms 140 when the impellers 180 are in an unfolded state.

Referring to FIG. 12 and FIG. 13, when the piston 160 is moved down together with the inner stem (not shown) of the shaft (not shown), the pressing protrusions 166 may press down on the arm pressing parts 142. As a result, the impeller arms 140 and the impellers 180 may be rotated 90 degrees, and all of the impellers 180 may be unfolded. When the position of the inner stem is secured, the piston 160 can also be kept at the lowered state, allowing the impellers 180 to maintain the unfolded state.

Figure 14:
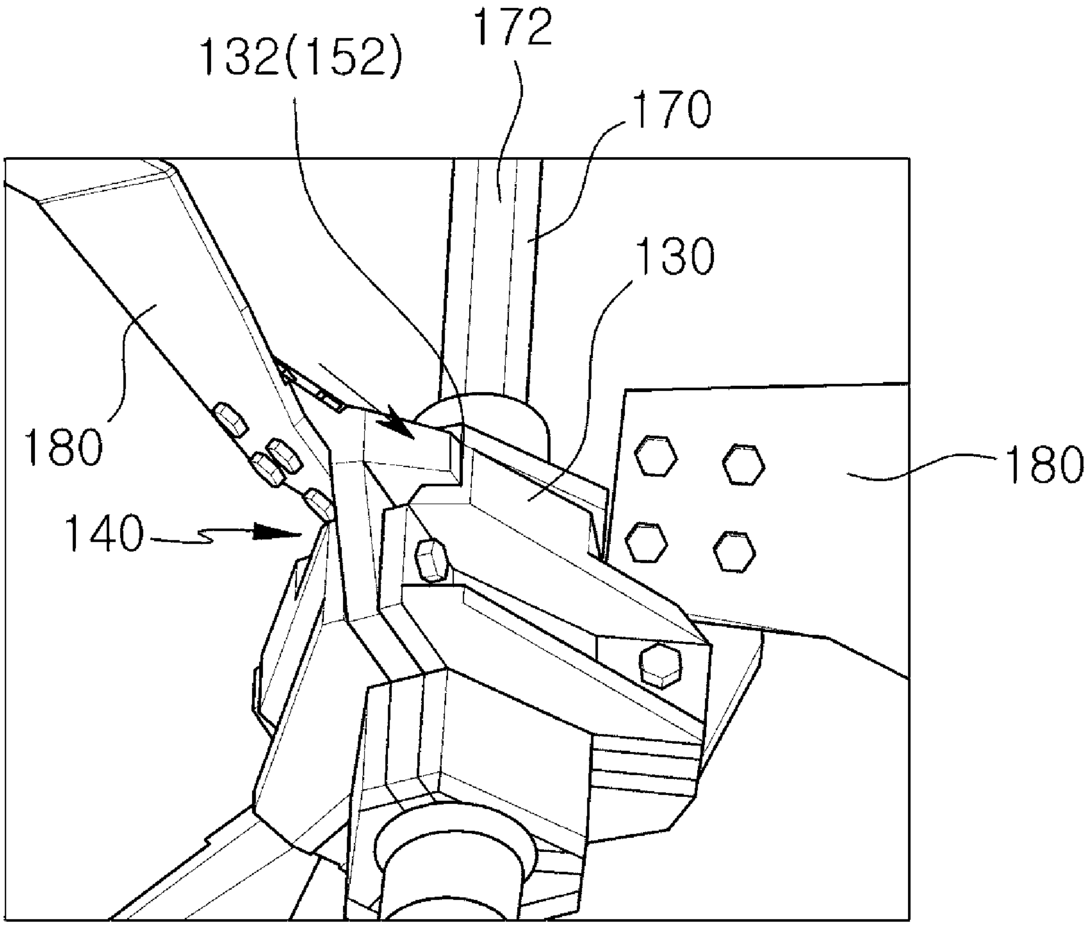
FIG. 14 and FIG. 15 illustrate the impeller arms and the coupling body in the state shown in FIG. 3.
Figure 15:
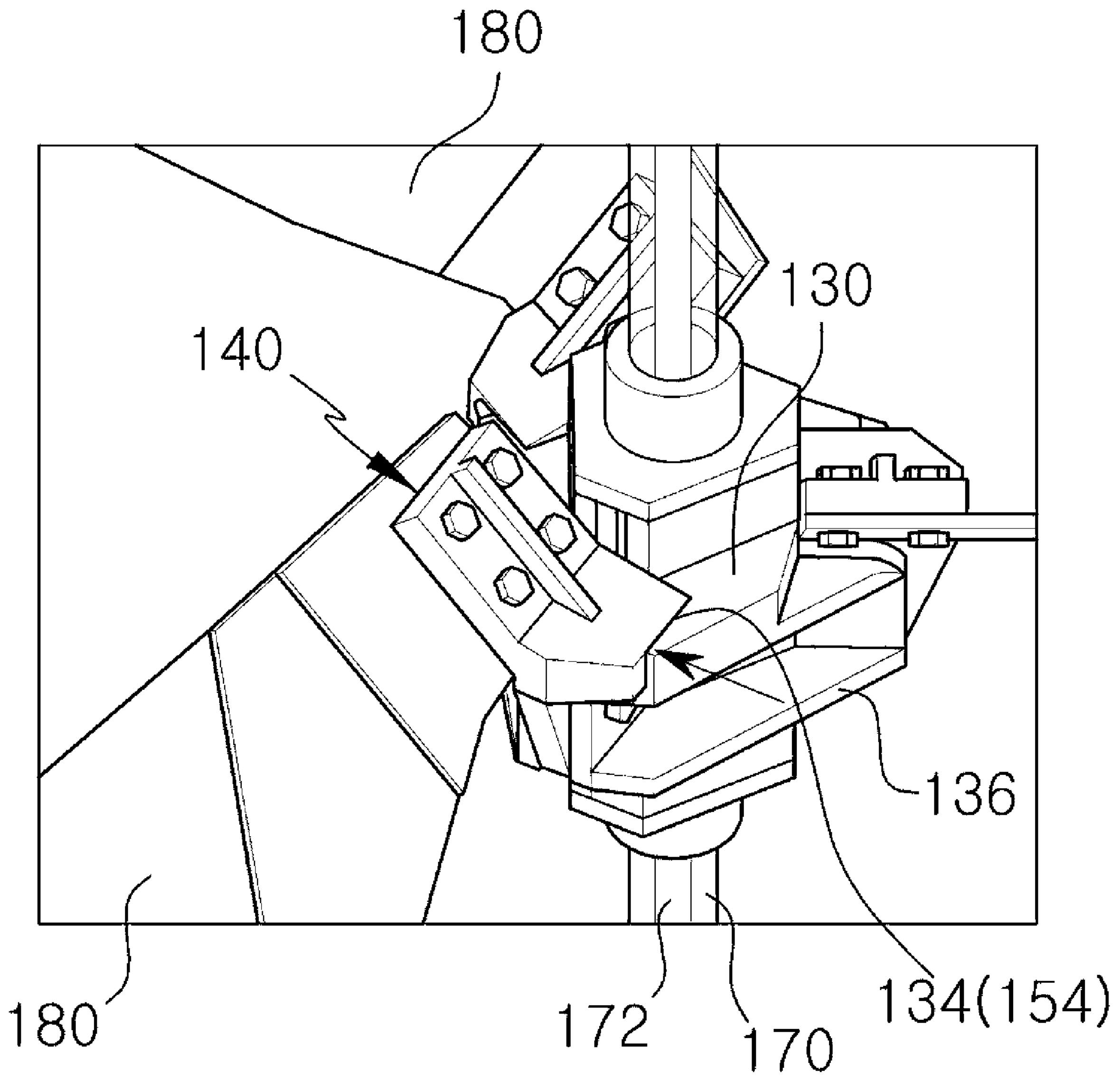

FIG. 14 and FIG. 15 illustrate the impeller arms 140 and the coupling body 102 when the impellers 180 are in an unfolded state.

Referring to FIG. 14, when the impellers 180 are unfolded due to the downward movement of the inner stem 172 of the shaft 170, the first arm support surfaces 152 of the impeller arms 140 may be placed in surface contact with the first body support surfaces 132 of the coupling body 102. As a result, the upper support members 130 may support the loads applied on the impeller arms 140 in the central direction (see arrow), thereby preventing damage to the impeller arms 140 and allowing a stable rotation of the impellers.

Referring to FIG. 15, when the impellers 180 are unfolded, the second arm support surfaces 154 of the impeller arms 140 may be placed in contact with the second body support surfaces 134 of the coupling body 102. As a result, the upper support members 130 may support the loads applied on the impeller arms 140 in the rotational direction (see arrow), thereby preventing damage to the impeller arms 140 and allowing a stable rotation of the impellers.

The shape of the impellers 180 may be changed from that of the conventional impeller to have a size conducive for entering through the opening of a tank in a folded state. In particular, the portion of an impeller 180 that has a greater impact on flow corresponds to the distal portion of the impeller 180 rather than the portion close to the coupling body 102. Whereas a conventional impeller is formed such that the width of the impeller near the hub portion is greater than the widths at other portions (see FIG. 1), an embodiment of the invention can have the portion near the coupling body 102 formed with the smaller width, in order to both improve flow performance and reduce the overall volume when the impeller 180 is folded.

Although a foldable agitator 100 according to this embodiment is illustrated as a single-level agitator that has one coupling body 102 coupled to the shaft 170, it is possible to implement the agitator with two or more levels.

An inner stem 172 that is capable of vertical movement may be provided within the shaft 170, where the inner stem and the shaft 170 may be joined by screw-coupling. Thus, an agitator 100 according to this embodiment can have a rotary shaft having a dual-tube structure in which the inner stem 172 is movable within the shaft 170. A conventional agitator may include a separate device outside the shaft for folding the impellers, where such device may frequently experience malfunctions due to the adherence of various substances within the tank. A shaft 170 having a dual-stem structure according to this embodiment can prevent the occurrence of such malfunctions.

While the foregoing provides a description with reference to an embodiment of the present invention, it should be appreciated that a person having ordinary skill in the relevant field of art would be able to make various modifications and alterations to the present invention without departing from the spirit and scope of the present invention set forth in the scope of claims below.

What is claimed is:

1. A foldable agitator comprising:

a coupling body defining a central longitudinal axis;

a plurality of impeller arms rotatably coupled to an outer peripheral portion of the coupling body; and a piston inserted in the coupling body, the piston being movable along the central longitudinal axis, the piston being configured to unfold or fold the plurality of impeller arms simultaneously in response to a movement of the piston along the central longitudinal axis, wherein the coupling body comprises a plurality of body coupler parts and a piston insertion part, the plurality of body coupler parts being arranged around the piston insertion part, each of the plurality of body coupler parts having each of the plurality of impeller arms coupled thereto, the piston insertion part having the piston movably inserted therein, wherein an insertion slot is defined between adjacent ones of the plurality of body coupler parts, wherein the piston comprises a pressing protrusion positioned to be movable within the insertion slot, and wherein a proximal end portion of each of the plurality of impeller arms is coupled to the outer peripheral portion of the coupling body at the insertion slot and is configured to be rotated within the insertion slot by linear movement, along the central longitudinal axis, of the pressing protrusion within the insertion slot.

2. The foldable agitator of claim 1, further comprising:

a shaft coupled to the plurality of body coupler parts; and an inner stem positioned to form a dual stem structure, the inner stem being rotatably coupled with the piston.

3. The foldable agitator of claim 1, wherein an inner stem is rotatably connected to the piston, and wherein the inner stem is coupled to an upper portion and a lower portion of the piston to form a multi-level structure.

4. The foldable agitator of claim 1, wherein an impeller is coupled to each of the plurality of impeller arms, and wherein width at a longitudinally central portion of the impeller is greater than a width of a proximal end portion of the impeller connecting with the coupling body.

5. The foldable agitator of claim 1, wherein the piston insertion part comprises a plurality of movement slots, each corresponding to a respective one of the plurality of impeller arms, wherein the piston comprises heads and a plurality of insertion modules, each of the plurality of insertion modules being movably inserted in each of the plurality of movement slots, the heads being coupled to both ends of the plurality of insertion modules, and wherein the pressing protrusion is positioned on one lateral surface of each of the plurality of insertion modules.

6. The foldable agitator of claim 1, wherein each of the plurality of body coupler parts comprises a coupling member, and wherein each of the plurality of impeller arms comprises an arm pressing part and an arm coupling part, the arm pressing part being inserted in the insertion slot and rotatably coupled to the coupling member, the arm coupling part extending at a predetermined angle from one end of the arm pressing part to determine an unfolding angle of an impeller, the arm coupling part being coupled with the impeller.

7. The foldable agitator of claim 1, wherein each of the plurality of body coupler parts comprises an insertion member and a coupling member, the insertion member defining the piston insertion part, the coupling member being disposed on a lateral side of the insertion member and having a respective one of the plurality of impeller arms coupled thereto, and wherein adjacent ones of the coupling members are separated by a gap, the gap being the insertion slot.

8. The foldable agitator of claim 7, wherein an upper support member and a lower support member are positioned on an outer side surface of the coupling body, and wherein opposite end portions of each of the upper support member and the lower support member support the coupling members.

9. The foldable agitator of claim 8, wherein the upper support member comprises a first body support surface and a second body support surface, wherein each of the plurality of impeller arms comprises a first arm support surface and a second arm support surface, the first arm support surface being configured to contact the first body support surface, the second arm support surface being configured to contact the second body support surface, wherein the first arm support surface is configured to contact the first body support surface in a direction toward a center of the coupling body, and the second body support surface and the second arm support surface are configured to contact each other in a rotational direction of the foldable agitator.

* * * * *